Jan. 30, 1923.                                                                1,443,703.
N. C. DIVELBISS.
VEHICLE BRAKE.
FILED OCT. 6, 1921.

Inventor,
Newton C. Divelbiss,
By Thomas R. Harney
Attorney

Patented Jan. 30, 1923.

1,443,703

UNITED STATES PATENT OFFICE.

NEWTON C. DIVELBISS, OF SAN LEANDRO, CALIFORNIA, ASSIGNOR OF ONE-HALF TO EMMA R. BOWNE, OF SAN FRANCISCO, CALIFORNIA.

VEHICLE BRAKE.

Application filed October 6, 1921. Serial No. 505,878.

*To all whom it may concern:*

Be it known that I, NEWTON C. DIVELBISS, a citizen of the United States of America, residing at San Leandro, in the county of Alameda and State of California, have invented certain new and useful Improvements in Vehicle Brakes, of which the following is a specification.

My present invention relates generally to vehicle brakes, and more particularly to brakes as applied to the brake drums of automobiles and motor cars, my object being the provision of an extremely effective and efficient device which needs no lining, whose upkeep as well as first cost is economical in a marked degree, and whose action is positive and will permit of the use of oil so as to avoid scratching and screeching noises so common to be found in brakes of this general type.

Figure 1:
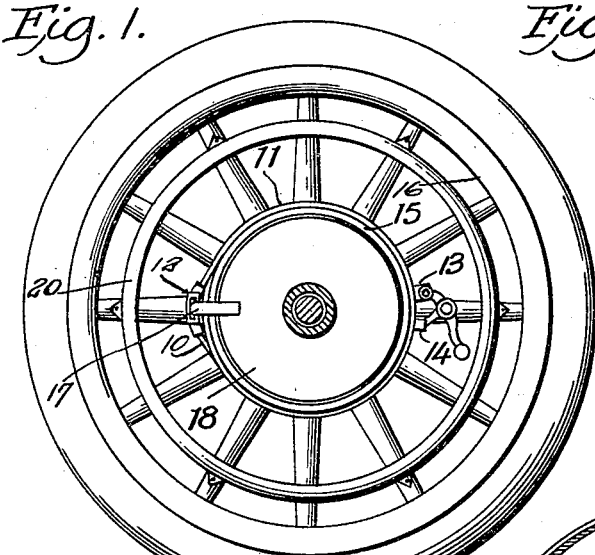
Figure 2:
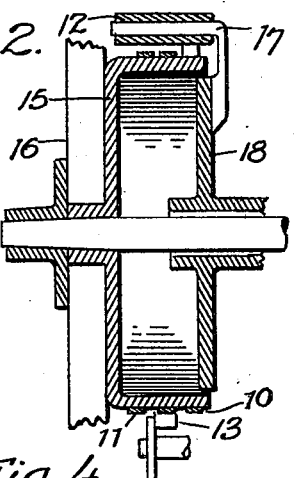
Figure 3:
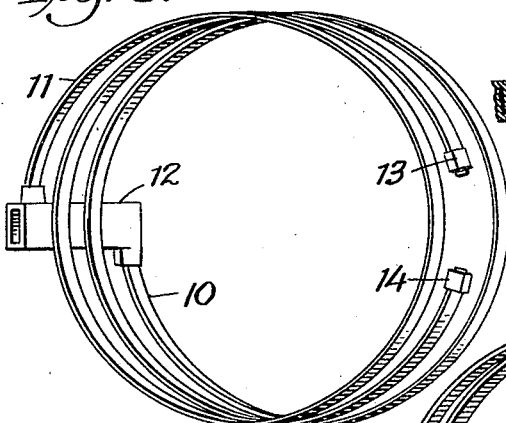
Figure 4:
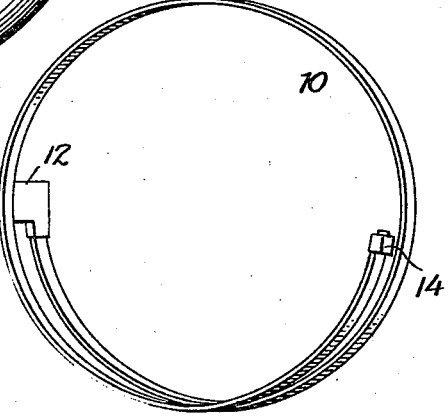
Figure 5:
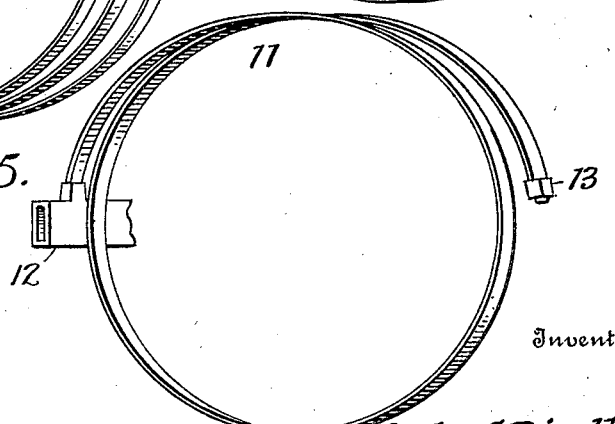

In the accompanying drawing which illustrates my present invention and forms a part of this specification, Figure 1 is a side view of a wheel embodying my invention, Figure 2 is a transverse section through a portion thereof at the upper part of the brake band, Figure 3 is a perspective view of my improved brake apart from the wheel, Figure 4 is a similar view of one section or gripping member, and Figure 5 is another perspective view of the other section or gripping member.

Referring now to these figures and particularly to Figures 3, 4 and 5 my invention proposes a vehicle brake consisting of a pair of sections or gripping members 10 and 11, each of which is formed of a helically coiled cable, wire or band and each of which preferably includes one full convolution and half of another convolution, bringing its opposite ends at approximately diametrically opposite points of the complete section. The two sections or gripping members are rigidly anchored at one end to the relatively opposite ends of a socket member 12 from which the helical coils proceed in opposite directions, the half convolutions of the two gripping members proceeding toward the center of the complete brake so that there is formed in effect three complete gripping convolutions as seen in Figure 3, the free ends 13 and 14 of the gripping members being in adjacent opposed relation between the outermost full convolutions.

The brake so formed is well adapted for use in connection with the usual brake band or drum 15 of a vehicle wheel 16 as in Figures 1 and 2, the socket member 12 to which the gripping members are anchored at one end as before described, receiving the usual stud 17 projecting from the brake flange 18, and the lugs at the free ends 13 and 14 of the gripping members attaching to the brake lever whose operation is brought about in the usual manner for contracting the gripping members on the brake drum.

It is obvious that in action the ends 13 and 14 of the gripping members are drawn toward one another when the brake is set and shifted away from one another when the brake is released and that in the first mentioned movement the gripping members will be drawn tightly into engagement with the brake band entirely therearound so that the gripping action will be particularly effective without the use of the friction brake linings ordinarily required. As constructed my improved brake will even admit of the use of lubricating oil to prevent overheating as well as the noisy application of brakes so common to the usual type, without impairing its action in any respect or its ability to actually lock the wheel when sufficient pressure is applied for this purpose.

In view of the permissible use of oil I may also employ a shield in the nature of a ring 20 around the brake member, which may be attached as shown to the spokes of the wheels and which is transversely curved so as to entrap small flying particles of oil and prevent the same from spreading over the various parts of the wheel.

I claim:

1. An unlined brake for vehicle wheels consisting of a pair of oppositely coiled gripping members having a common support at one end and having adjacent and opposing free ends.

2. A contracting brake member consisting of a pair of oppositely coiled brake members connected to one another at one end and having their opposite ends in adjacent opposed relation.

3. A contracting brake member consisting of a pair of oppositely coiled brake members connected to one another at one end and having their opposite ends in adjacent opposed relation, each gripping member including one full convolution and a half of another convolution as described.

4. A contractible brake consisting of a pair of helically coiled gripping members, a support to which said members are connected at one end and from which the coils extend in relatively opposite directions, said gripping members having free opposite ends disposed in adjacent opposed relation diametrically opposite to the said connecting member.

5. A contractible brake, consisting of a pair of helically coiled gripping members, a support to which said members are connected at one end and from which the coils extend in relatively opposite directions, said gripping members having free opposite ends disposed in adjacent opposed relation diametrically opposite to the said connecting member and located between complete convolutions of the members as described.

In testimony whereof I have affixed my signature.

NEWTON C. DIVELBISS.